INVENTOR.
ELMER G. HILLS
BY
Foorman L. Mueller
ATTORNEY

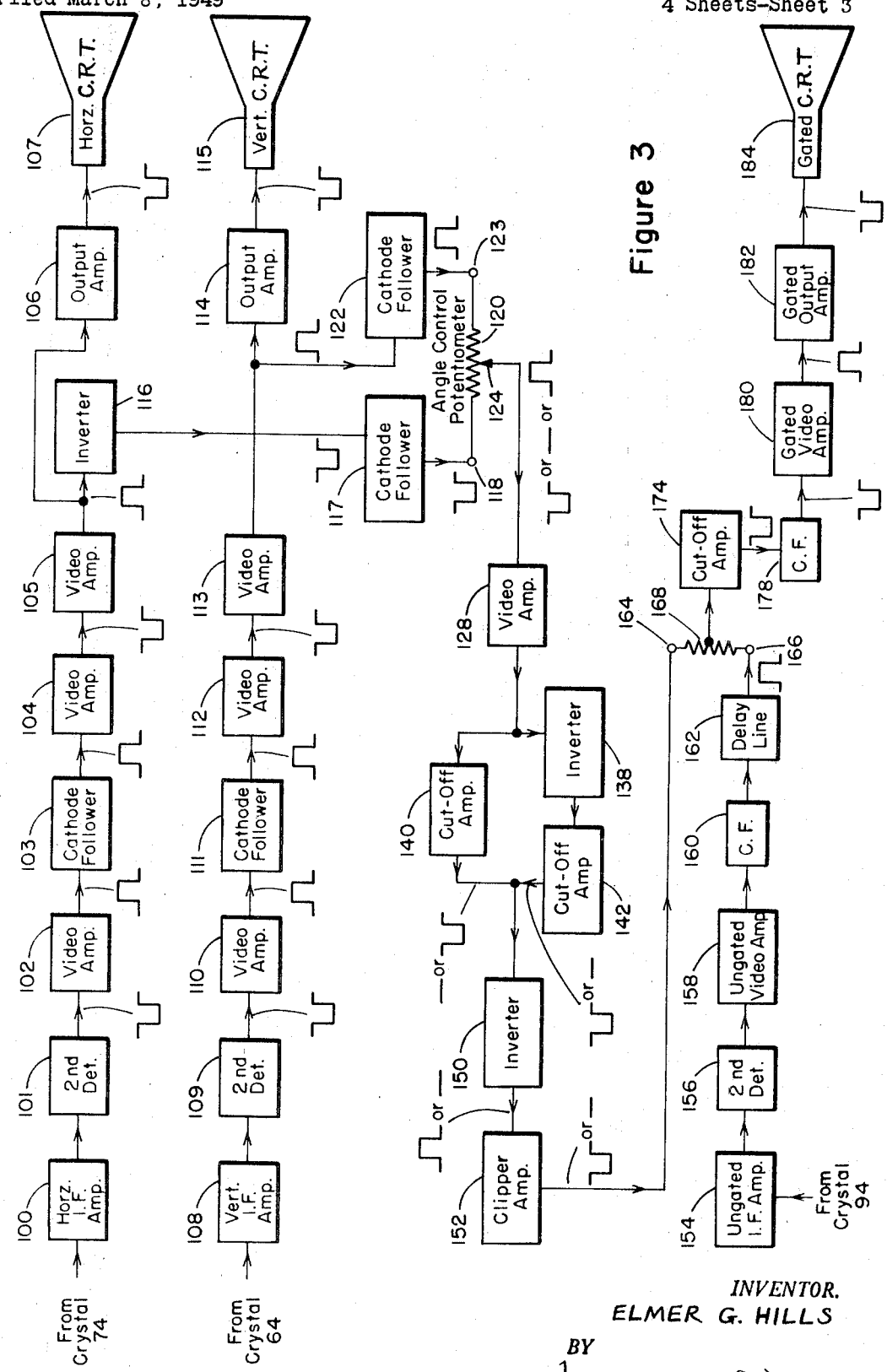

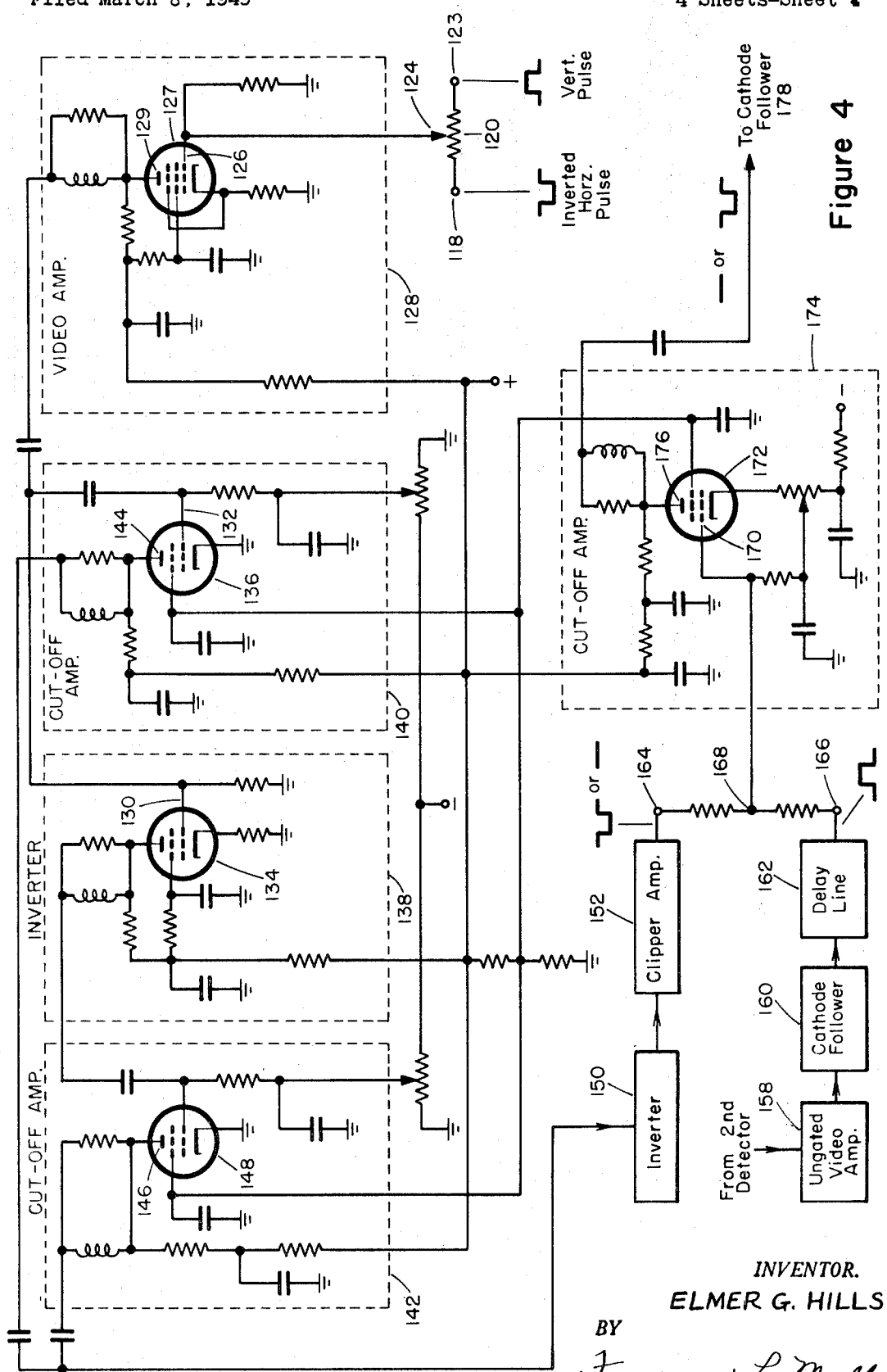

United States Patent Office 3,566,403
Patented Feb. 23, 1971

3,566,403
POLARIZED RADAR DETECTION SYSTEM
Elmer G. Hills, Chicago, Ill., assignor to Raytheon Company, Lexington, Mass., a corporation of Delaware
Filed Mar. 8, 1949, Ser. No. 80,238
Int. Cl. G01s 9/02
U.S. Cl. 343—5                                    12 Claims

ABSTRACT OF THE DISCLOSURE

A radar system adapted to differentiate between man-made targets and natural objects in which plane polarized energy is transmitted and, after reflection, echo signals are received by two antennas, one having a plane of polarization coplanar with the plane of polarization of the transmitted energy and the other having a plane of polarization orthogonal thereto. After the echo signals are processed in two separate channels and compared, a blanking signal is generated from signals which suffer the least amount of change in polarization, i.e. echo signals from natural objects to accentuate echo signals from man-made targets.

---

The invention herein described was made in the course of or under a contract or subcontract thereunder, with the Department of Defense.

This invention relates to improvements in radio object-locating systems for enabling such systems to distinguish specific target signals from ground clutter and the like.

Prior types of object-locating systems have not proved successful in locating a specific stationary target in the midst of other reflecting objects that ordinarily tend to obscure the target. For example, one may want to locate a stationary (or slowly moving) tank or truck in a forest. Heretofore, under such circumstances, it has not been feasible to blank out the clutter produced by the forest without affecting the target signal, too.

The present invention makes use of the fact that a reflecting object usually causes an incident polarized wave to change its polarization in the course of being reflected. It has been observed that different classes of objects will produce different amounts of depolarization (change of polarization) for a transmitted wave of given polarization. This phenomenon is utilized herein to distinguish bona fide target echoes from the echoes produced by other classes of objects, such as trees. The signals received from trees and other natural objects (hereinafter referred to generally as "ground clutter") are seldom, if ever, depolarized more than a given amount with respect to the transmitted wave. On the other hand, the depolarization effected by a man-made target such as a truck or a tank is almost always greater than this amount.

An object of the present invention is to provide an improved radio object-locating system and method which make use of the aforesaid principle for blanking out ground clutter and identifying particular targets that normally would be obscured by the ground clutter.

A further object is to provide an improved locating system which is able to pick out a target in the midst of other objects without depending upon movement of that target.

A still further object is to provide a radio object-locating system which has greater resolution than prior systems, all other factors being equal.

Still another object is to provide a novel polarization-responsive gating means which is adjustable for varying the acceptance angle of the receiver at will.

The invention features a method of wave analysis which involves the separate reception and subsequent combination of target signal components which are respectively intercepted by a pair of antennas disposed at an angle (preferably a right angle) with respect to each other. For instance, the received signal may be resolved into a horizontal component and a vertical component, the relative magnitude of these components depending upon the polarization of the incoming signal wave. The receiver can be adjusted to accept signals having various angles of polarization by combining varying amounts of the two received components and permitting the target signal to be displayed when the combined components cancel each other. However, if the angle of polarization does not correspond to the acceptance angle, the components will not cancel, and as a result of this, a gating operation will take place to suppress the entire target signal.

Another feature is the use of a proportionating device in the form of an angle control potentiometer for combining the respective magnitudes of video pulses which respectively represent the two components of the incoming signal. For each setting of the potentiometer there is a particular relationship in the magnitudes of these components, that is, a particular angle of polarization, which is acceptable by the receiver. The output of the potentiometer may be positive, negative or zero with respect to a reference voltage level, depending upon the polarization of the incoming signal relative to this critical polarization.

Still another feature is the gate pulse-forming means controlled by the potentiometer, which produces a gate pulse or not depending upon the potentiometer output. A signal receiving means for indicating the target signal includes a cut-off or gate circuit to which the gate pulse, if any, is applied. Signals which are not of the polarization to which the receiving means is adjusted are suppressed by gate action and are not displayed on the indicator.

The foregoing and other objects, features and advantages of the invention will be better understood from the following detailed description taken in connection with the accompanying drawings, wherein:

FIG. 3 is a complete block diagram of the intermediate-frequency and video portions of the system; and FIG. 4 is a schematic diagram of certain components in the video portion of the system.

In practicing the invention, the exploratory pulses of wave energy are radiated from a vertically polarized antenna. As these pulses strike reflecting objects, they are depolarized to varying degrees from the vertical depending upon the nature of the object. The reflected pulses are intercepted by the vertically polarized antenna and a companion horizontally polarized antenna. Each reflected pulse, it may be assumed, has a horizontal component and a vertical component. These components are separately detected to provide video pulses respectively representative of the vertical and horizontal components, and they also are combined to provide a signal equivalent to that which would have been received by a single antenna oriented parallel to the polarization of the incoming wave.

The horizontal and vertical video pulses are caused to have an inverse relationship with respect to each other, and they have magnitudes that are proportionate to the respective components which they represent. These pulses are applied to opposite terminals of an angle control potentiometer. The movable tap of the potentiometer is set in a position which corresponds to a desired signal polarization, or it may be swept through all of the possible positions to find an incoming signal, with the position of the potentiometer indicating the polarization of the signal. For these purposes the potentiometer may be calibrated according to the polarization acceptance angles. A combination of limiting amplifiers and inverters serves to convert the potentiometer output to a negative gate pulse in the event the horizontal and vertical components do not have a relationship which agrees with the angle for which the potentiometer is set. If the potentiometer output is indicative of agreement between signal polarization and acceptance angle, however, no gate pulse is formed.

A gate circuit, which comprises a cut-off amplifier, is included in the section of the receiver which amplifies and detects the resultant target signal obtained by combining the horizontal and vertical components thereof. In the case of those signals having polarizations that differ from the acceptance angle of the receiver, a negative gate pulse is supplied to the cut-off amplifier to prevent such signals from being displayed on the indicator. But if the incoming signal has been reflected from a target which gives it the correct polarization for acceptance by the receiver, it will be displayed on the indicator.

Figure 1:
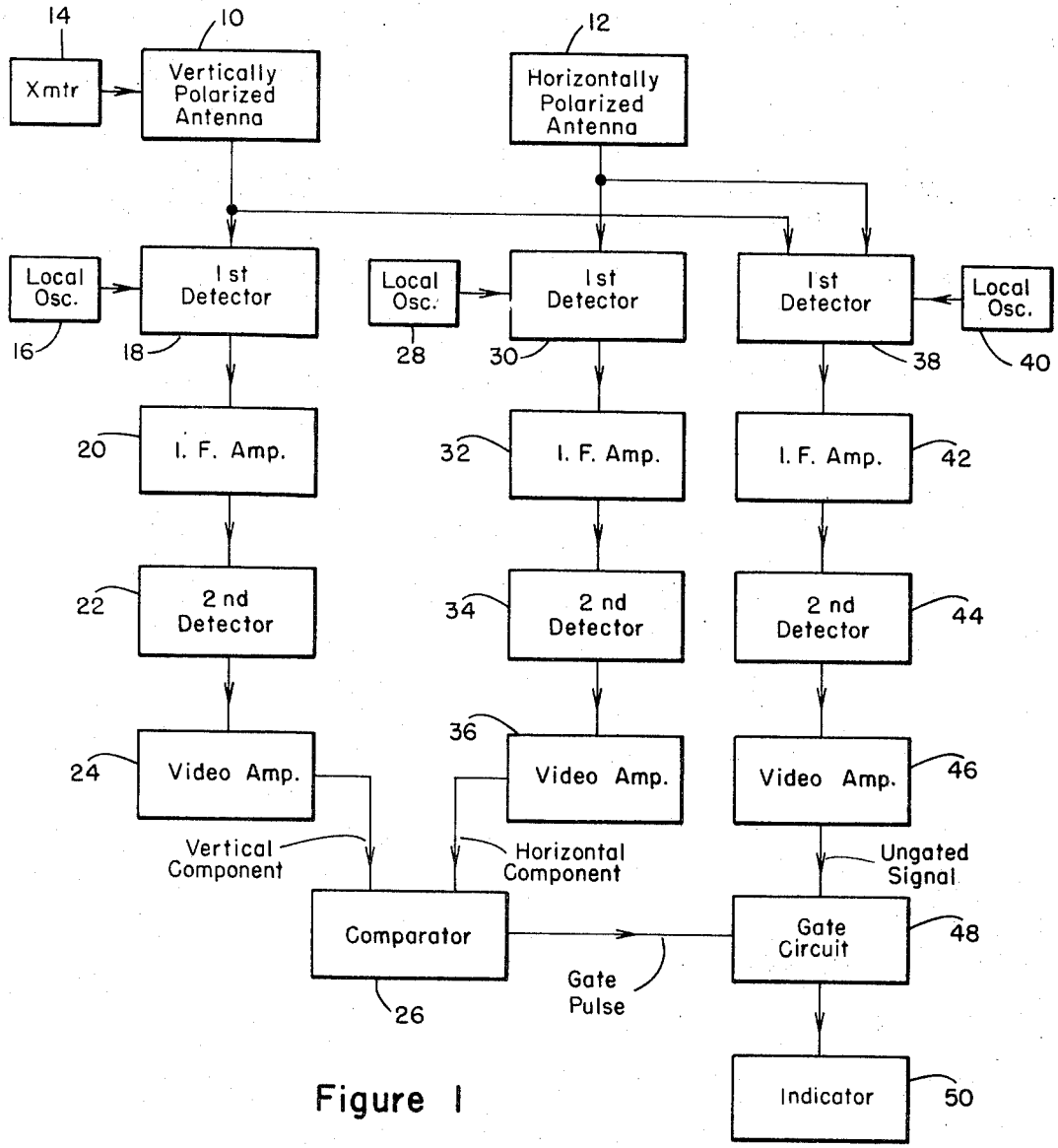
FIG. 1 is a block diagram showing, in simple form, a system constructed in accordance with and embodying the invention.

Referring now to FIG. 1, which is a simple block diagram of the system, a vertically polarized antenna 10 and a horizontally polarized antenna 12 are employed respectively to intercept the vertical and horizontal components of the incoming reflected signal. The vertical antenna 10 also serves to radiate the exploratory, polarized wave pulses which are developed by the transmitter 14. The vertical component intercepted by the antenna 10 is mixed with oscillations from a local oscillator 16 in the first detector 18. The heterodyned signal passed through an intermediate-frequency amplifier 20 and is detected by the second detector 22. The resulting video signal passes through a video amplifier 24 and is applied to one side of the comparator 26, the construction of which will be disclosed more fully hereinafter.

In similar fashion, the horizontal component from the antenna 12 is mixed with a local signal from the oscillator 28 in the first detector 30. The resulting signal then passes successively through the intermediate-frequency amplifier 32, second detector 34 and video amplifier 36. The video signal representing the horizontal component then is applied to the second side of the comparator 26. The vertical and horizontal video components are compared by the device 26, and if these components do not have a desired relative value, as determined by the setting of the comparator 26, a signal-suppressing gate pulse appears in the output of the comparator 26 to prevent the incoming signal from being indicated.

The vertical and horizontal signal components from the antennas 10 and 12 are applied also to a first detector 38. After being heterodyned with a signal from the local oscillator 40, the incoming signal is passed successively through the intermediate-frequency amplifier 42, a second detector 44 and the video amplifier 46 to a gate circuit 48. In the absence of a gate pulse, the signal passes through the gate circuit 48 and is displayed on the indicator 50. The first detector 38 preferably has the property of combining the horizontal and vertical components in such fashion as to produce a resultant which represents the vector sum of the components. The indicator can thus be calibrated in terms of the received signal itself.

The output signal from the video amplifier 46 can pass through the gate circuit 48 only in the absence of a gate pulse from the comparator 26. This occurs only when the incoming signal has the polarization corresponding to the setting of the comparator 26. Assuming, for example, that it is desired to locate trucks or like targets in a forested area and that one knows the approximate amount of depolarization to expect in the case of such objects, the apparatus is adjusted to receive signals having the depolarization that would be imparted by a truck or the like in reflecting the incident, vertically polarized wave. A ground clutter signal would not satisfy this relationship, and it would cause a gate pulse to be formed and applied to the gate circuit 48 coincidentally with the application of the ungated signal to the circuit 48. The gate circuit 48 then functions to prevent the signal from being displayed on the indicator 50. The procedure to be followed in case the operator does not know in advance how much depolarization to expect from a specified class of objects will be described subsequently.

Figure 2:
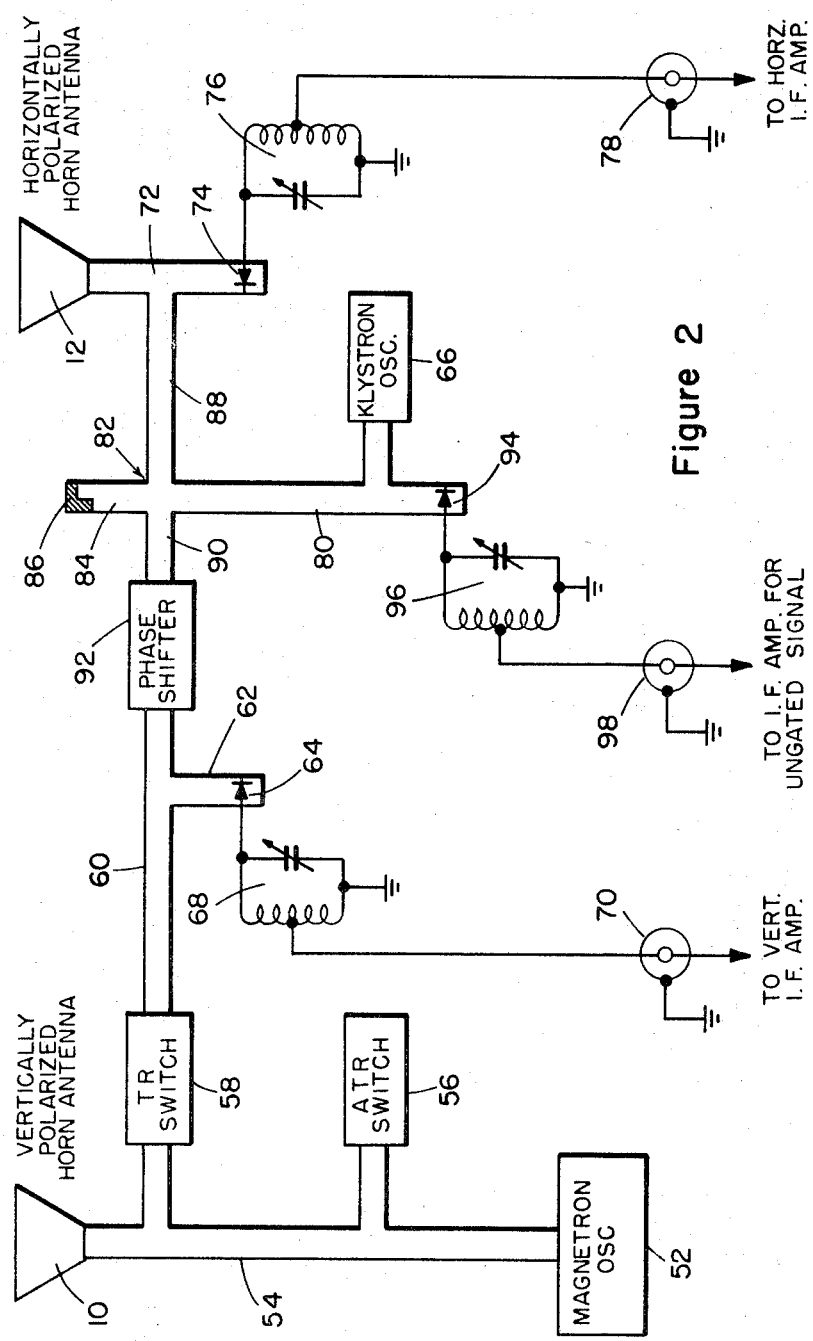
FIG. 2 is a schematic illustration showing the radio-frequency portion of the system.

FIG. 2 is a diagram of the wave guide structure which may be used in the radio-frequency portion of the system. The magnetron oscillator 52, which is pulsed by suitable means (not shown), may be used as the transmitter to furnish wave energy through the wave guide 54 to a vertically polarized horn antenna 10. The antenna 10 also functions as a receiving antenna. The anti-transmit-receive (ATR) switch 56 in communication with the guide 54 prevents the reflected pulses or echoes from feeding into the oscillator 52. These echo pulses pass through a transmit-receive (TR) switch 58 into a wave guide 60, and a portion of the wave energy is diverted to a stub 62 in which is located a first detector consisting of a crystal mixer 64. A klystron oscillator 66 (FIG. 2) furnishes the local oscillations for all three of the first detectors, in lieu of the separate local oscillators 16, 28 and 40 shown in FIG. 1. After being mixed with the local signal in the crystal 64, the vertical IF signal passes through a tuned circuit 68 and a coaxial cable 70 to the vertical IF amplifier.

In similar fashion, the horizontal component received by the antenna 12 is fed through a wave guide 72 to a crystal mixer 74. The output from the crystal 74 is fed through a tuned circuit 76 and coaxial cable 78 to the horizontal IF amplifier.

The klystron oscillator 66 is located in a branch 80 of a T-junction 82, known in the art as a hybrid or magic T. A second leg 84 of the T-junction 82 terminates in a matched load 86. A third leg 88 extends to the wave guide 72, and a fourth leg 90 is coupled through the phase shifter 92 to the wave guide 60. The T-junction 82 isolates the vertical and horizontal antennas 10 and 12 so that the vertically polarized signal cannot get into the horizontal crystals 74, and the horizontally polarized signal cannot get into the vertical crystal 64. The wave energy from each antenna divides, part of it being absorbed in the load 86 and the remainder passing through the leg 80 to a crystal mixer 94. The phase shifter 92 causes the vertical signal to be displaced in phase 90 degrees from the horizontal signal. By combining the horizontal and vertical components 90 degrees out of phase, a resultant is produced which is equal to the vector sum of these components, or in other words, it has a value proportional to that of the incoming reflected signal. This resultant signal is mixed with the output from the klystron oscillator 66 to produce an intermediate-frequency signal which passes through a tuned circuit 96 and a coaxial line 98 to the intermediate-frequency amplifier which handles this ungated signal. (The term "ungated" is used to denote the signal before it is fed to the gate circuit as 48, FIG. 1.)

FIG. 3 shows, in more complete form than FIG. 1, the various components of the system following the radio-frequency portion illustrated in FIG. 2. The horizontal intermediate-frequency signal is amplified by the amplifier 100 and detected by the second detector 101 to produce a negative video pulse. This video pulse then is passed successively through the video amplifier 102, cathode follower 103, video amplifiers 104 and 105, and the output amplifier 106, which latter feeds the negative output pulse to the cathode ray tube indicator 107 that is used for displaying the horizontal component of the received signal. Each time a video pulse passes through an amplifier, its polarity is changed, but the pulse polarity is not changed by a cathode follower as 103. In like fashion, the vertical intermediate-frequency signal passed by the amplifier 108 is detected by the second detector 109 to produce a negative video pulse, which then is passed successively through the video amplifier 110, cathode follower 111, video amplifiers 112 and 113, and the output amplifier 114 which feeds the cathode ray tube indicator 115 for displaying the vertical component.

The positive video pulse in the output of the amplifier 105 for the horizontal component is passed through an inverter 116, which reverses the polarity of the video pulse without affecting its amplitude. The inverted horizontal video pulse then is passed through a cathode follower 117 and is applied to one terminal 118 of an angle control potentiometer 120. The positive video pulse in the output of the amplifier 113 for the vertical component is passed through a cathode follower 122 and is applied to a terminal 123 of the potentiometer 120. The terminals 118 and 123 are at substantially the same potential between pulses. The negative horizontal pulse and the positive vertical pulse have absolute magnitudes which are proportionate to the respective values of the horizontal and vertical signal components intercepted by the antennas 12 and 10, respectively. These pulses are applied concurrently to the opposite terminals of the potentiometer 120.

The movable contact 124 of the potentiometer 120 is set in a position corresponding to the desired polarization of the incoming signal. If, for example, the observer is interested in echo signals which are polarized at 45 degrees, the contact 124 then is set at the middle of the potentiometer, assuming that the same is linearly wound. It is obvious, of course, that the single potentiometer shown in the drawing may be replaced by a pair of potentiometers if so desired, and the expression "potentiometer" therefore should be construed broadly with this in mind. The potential of the contact 124 during a pulse period may be negative, zero, or positive. That is to say, the potential at 124 may be lower than the "no-pulse" level due to the fact that the inverted horizontal pulse has the greater absolute magnitude, or it may be equal to the no-pulse level when the two pulses cancel each other exactly, or it may be positive as would occur when the positive vertical pulse is larger than the horizontal pulse, for the example given.

The output of the potentiometer 120 is fed to a series of limiting and inverting devices illustrated in FIGS. 3 and 4, which convert this potentiometer output to a gating impulse. The movable contact 124 is electrically connected to the control grid 126 of a tube 127 in the video amplifier 128. The output pulse appearing at the plate 129 of the amplifier tube 127 is applied in parallel to the control grids 130 and 132 of tubes 134 and 136, which are respectively disposed in an inverter 138 and a cut-off amplifier 140. The cut-off amplifier 140 is biased to the cut-off point. If the video output pulse of the amplifier 128 is negative, the amplifier 140 will not pass any part of this pulse. If the pulse applied to the amplifier 140 is positive, the pulse will pass through the amplifier 140, and its polarity will be reversed to give a negative pulse.

The inverter 138 reverses the polarity of the video output pulse, if any, of the amplifier 128 and applies this inverted pulse to the cut-off amplifier 142. If the video pulse from the amplifier 128 had been negative, it would be positive when applied to the input of amplifier 142, and negative in the output of amplifier 142. If the video pulse from 128 had been positive, it would be negative when applied to the input of amplifier 122, and consequently would be cut off by the amplifier 142.

From the foregoing it will be seen that whenever the horizontal or vertical component of the signal preponderates (assuming that the potentiometer 120 is set in its 45 degree position), a negative video pulse appears in the output of either the amplifier 140 or the amplifier 142. On the other hand, if the horizontal and vertical components cancel each other, no pulse is furnished by either of the amplifiers 140 and 142. The plates 144 and 146 of the tubes 136 and 148 in the amplifiers 140 and 142, respectively, are coupled in parallel to the input side of an inverter 150. It will be recalled that the amplifiers 140 and 142 will furnish a negative pulse (or no pulse) to the inverter 150. This is changed to a positive pulse (or no pulse) in the output of the inverter 150, which pulse is fed to a clipper-amplifier 152.

The differential video signal in the output of the potentiometer 120, when the horizontal and vertical components do not balance, is amplified a great many times before it reaches the clipper-amplifier 152. Hence, for any differences in the vertical and horizontal components, except those within close limits, the clipper-amplifier 152 will furnish an output gate pulse of uniform amplitude and negative polarity. If there is substantially no difference in the amplitude of the horizontal and vertical components (still assuming that these components should be equal), a negative gate pulse does not appear in the output of the clipper-amplifier 152.

The ungated signal which results from combining the horizontal and vertical components in the mixer 94 (FIG. 2) is fed through an intermediate-frequency amplifier 154, FIG. 3, to a second detector 156. The resulting video signal is amplified by the video amplifier 158, FIGS. 3 and 4, and is then passed through a cathode follower 160 and a delay line 162. The purpose of the delay line 162 is to retard the video pulse from the amplifier 158 so that it will coincide in time with the gate pulse, if any, from the clipper-amplifier 152. These two video pulses are applied respectively to the end terminals 164 and 166 of a mid-tapped resistor 168 or its equivalent. The gate pulse from the clipper-amplifier 152 is negative in polarity when the horizontal and vertical signals do not cancel each other, or zero when these signals do cancel. The video pulse applied to the terminal 166 is always positive. The relative magnitudes of these video pulses are such that the negative gate pulse nullifies the positive video pulse, and it is only in the absence of a gate pulse (or in other words, when the gate pulse is zero) that the positive video pulse is effective.

The mid-tap of the resistor 168 is connected electrically to the control grid 170, FIG. 4, of a tube 172 in a cut-off amplifier 174. In the absence of a gate pulse, the positive pulse is amplified by the tube 172 and appears as a negative video pulse at the plate 176 thereof. This video pulse is passed successively through a cathode follower 178 (FIG. 3), a video amplifier 180 and an output amplifier 182 to the cathode ray tube indicated at 184, which displays the target signal. If a gate pulse is present, this signal is suppressed due to the fact that the gate pulse overcomes the positive video pulse applied to the grid 170 of the amplifier 174, FIG. 4, and drives this grid negative below the cut-off point.

The advantages of the disclosed radio object-locating system are believed to be evident from the foregoing description. Because of its ability to distinguish between classes of objects by the amounts of depolarization which these objects effect when an exploratory signal is reflected therefrom, the system facilitates the identification of targets and effectively blanks out ground clutter. It has been observed, for instance, that a forest seldom gives a depolarization greater than 40 degrees, whereas other targets such as trucks or tanks almost invariably impart a greater depolarization. By adjusting the angle control potentiometer 120 until a target signal corresponding to a depolarization greater than 40 degrees is observed, it may be assumed by the operator that there is an object in the forest which requires attention. This feature is especially useful in detecting stationary or slowly moving objects which would not be observed by hitherto known moving-target-indication (MTI) systems.

Greater resolution also is obtained by the use of the disclosed system. If a target and an interfering object are spaced apart by a distance which would correspond to less than a pulse width, they ordinarily would appear as a single image on the screen of a radio object-locating system. In the present case, however, the image of the interfering object may be eliminated altogether, leaving only a sharply-defined target image.

In the above description it has been assumed generally that the operator has at least an approximate idea of the correct acceptance angle to which the receiver should be adjusted for receiving signals from a selected class of objects. It is not necessary that the operator have this information, however, for he may sweep the potentiometer 120, and by observing the differences in the echo images on the oscilloscope screen for different positions of the potentiometer, he may arrive at a determination of the correct acceptance angle or at least sense any significant changes in the picture as the acceptance angle is varied. If no significant changes occur, that is, if all of the signals appear to increase or diminish uniformly throughout the sweep operation, this is a fair indication that no further investigation is required. However, when an object appears to stand out distinctly from the ground clutter at any point during the sweep, this may be cause for investigation.

It may happen that a particular target is located in proximity to several large trees, for example, which prevent the reflected signal from having the polarization that normally would be acceptable from such a target. Hence, there may be no indication on the oscilloscope showing the presence of a target for that particular acceptance angle. Yet, there is bound to be a significant indication of that target at some other acceptance angle which would differ substanially from that for trees alone.

The apparatus is quite flexible in its operation, and in the hands of an experienced operator there is substantially no likelihood that an important target would fail to be detected. The fact that the horizontal and vertical components of all signals are separately displayed, and that the magnitude of the resultant signal accepted by the receiver is indicated, also is valuable in furnishing data to the operator. By transmitting with polarizations other than vertical and receiving the components polarized parallel and perpendicular to the transmitted polarization, experiment has shown that more information is obtainable with the above system.

While the invention has been illustrated and described with reference to a preferred embodiment thereof, it should be understood that modifications of such embodiment can be effected within the spirit and scope of the invention as set forth in the appended claims.

I claim:

1. In a radio object-locating system which includes means for transmitting a signal having a given polarization, the combination comprising two antennas oriented to receive signals on two angularly displaced axes and serving to intercept the components of a reflected polarized signal which are respectively disposed on such axes, a comparing device responsive to the received signal components and effective to furnish a gate pulse having a value dependent upon the relative value of such signal components, signal receiving means adapted to furnish an output in response to and indicative of a reflected signal, and gating means responsive to the gate pulses from said comparing device for rendering said signal receiving means effective to indicate only those signals having a predetermined polarization.

2. In a radio object-loacting system which includes means for transmitting a signal having a given polarization, the combination comprising two antennas oriented to receive signals on two angularly displaced axes and serving to intercept the components of a reflected polarized signal which are respectively disposed on such axes, a comparing device responsive to the received signal components and effective to furnish a gate pulse for all relative values of such signal components except a given relative value, signal receiving means adapted to furnish an output in response to and indicative of a reflected signal, and gating means controlled by said comparing device for suppressing the operation of said signal receiving means when a gate pulse is present, said comparing device including an adjustable part for causing the value of the gate pulse to be substantially zero for any desired polarization of the reflected signal, whereby only a reflected signal having that particular polarization is indicated.

3. A receiver for the selective reception of polarized target signals in a radio object-locating system, comprising a pair of antennas oriented at an angle with respect to each other, a first wave signal translating means responsive to the first of said antennas, a second wave signal translating means responsive to the second of said antennas, both of said wave signal translating means being adapted to furnish video output pulses with substantially equal gain but relatively inverted polarities, the respective magnitudes of such video pulses being proportionate to the magnitudes of the signal components respectively intercepted by said antennas, a comparing device for comparing the respective magnitudes of the video pulses, said device being adapted to furnish a video gate pulse having a value dependent upon the relative magnitudes of the compared video pulses, and signal receiving means responsive to both of said antennas and adapted to furnish an output indicative of a signal reflected from a target, said signal receiving means including a cut-off amplifier responsive to gate pulses from said comparing device for preventing or enabling a received signal to be indicated dependent upon the polarization thereof.

4. A receiver for the selective reception of polarized target signals in a radio object-locating system, comprising a pair of antennas oriented at right angles to each other, signal receiving means including a first detector effective to combine the signal components respectively intercepted by said antennas to produce a resultant output signal having a magnitude determined by that of the reflected target signal, a target indicator for said signal receiving means, said signal receiving means including a gate circuit to prevent the target signal from being indicated when a gate pulse is applied to said circuit, a first component receiving means responsive to signal components intercepted by the first of said antennas, a second component receiving means responsive to signal components intercepted by the second of said antennas, the respective outputs of both said component receiving means being determined by the respective magnitudes of the two signal components, and a signal comparing device settable in accordance wtih a desired proportionate relationship between the magnitudes of the signal components and adapted to furnish signal-suppressing gate pulses to said gate circuit for all other relative magnitudes of the signal components, whereby only target signals having a predetermined polarization are indicated.

5. A receiver for the selective reception of polarized target signal waves in a radio object-locating system, comprising signal receiving means adapted normally to receive the target signal waves irrespective of the polarization thereof, and polarization-responsive gating means operative in timed relation with the reception of the target signal waves for preventing the normal operation of said receiving means except in response to target signal waves having a given polarization.

6. In a radio object-locating system having means for transmitting a polarized wave toward reflecting objects capable of depolarizing the incident wave by varying amounts, the combination comprising a pair of antennas oriented on different reference axes for respectively intercepting components of the reflected wave disposed on such axes, a first combining means for combining said components in a differential relationship to obtain a resultant indicative of the polarization of each particular reflected signal, a second combining means for combining the signal components of each reflected signal in an additive relationship to obtain a resultant which is indicative of the magnitude of such signal, an indicator, and a polarization-responsive gating device controlled by said first combining means and operatively interposed between said second combining means and said indicator.

7. The combination set forth in claim 6, wherein said first combining means has a continuously variable proportionating device for establishing a desired relationship between signal components, which relationship must be satisfied before said gating means will permit the signal from said second combining means to be displayed on said indicator.

8. In a radio object-locating system having means for transmitting polarized wave signals toward reflecting objects that are capable of returning signals which are depolarized in varying amounts with respect to the transmitted signal, the combination comprising, means adapted to receive such reflected signals including a pair of antennas disposed on reference axes for respectively intercepting the components of each incoming signal that are respectively disposed on such axes, combining means having parts respectively responsive to said antennas for combining the signal components, said combining means including a proportionating device settable in accordance with a desired acceptance angle for incoming signals for controlling the proportionate effect of each signal component upon the output of said combining means, whereby such output is indicative of the deviation between each particular signal polarization and the selected acceptance angle, gate pulse-forming means controlled by said combining means, and gating means controlled by gate pulses from said pulse-forming means and controlling said receiving means to render said receiving means ineffective except when signals having polarizations equal to the acceptance angle selected by said proportionating means are intercepted by said antennas.

9. The combination set forth in claim 8, wherein said proportionating device is continuously variable for sweeping the acceptance angle throughout a given range of signal polarizations.

10. In a receiver for a polarized radio object-locating system, a vertically polarized antenna, a horizontally polarized antenna, means for detecting the vertically polarized signal components intercepted by said vertically polarized antenna, means for detecting the horizontally polarized signal components intercepted by said horizontally polarized antenna, a potentiometer having two fixed terminals and a movable contact, means for respectively applying to said fixed terminals the detected horizontal and vertical components in relatively inverted relationship, gate pulse-forming means operatively connected to said movable contact and arranged to furnish a gate pulse when the relationship of the signal components is such that they cause the potential of said movable contact to change from the no-signal level thereof, other means for detecting and indicating the incoming signals, and a gate circuit controlled by said gate pulse-forming means for rendering said other means ineffective in response to a gate pulse.

11. A radio object-locating system for identifying objects by the depolarization of a wave which is produced when the wave is reflected by the objects, said system including in combination, means for intermittently radiating polarized waves toward said objects, means for receiving the waves reflected from said objects, said receiving means including means for analyzing the reflected waves to determine the angle of depolarization thereof, means for selecting a particular angle of depolarization and means coupled to said analyzing means and to said selecting means for indicating the amplitude of only the received reflected waves having the selected angle of depolarization.

12. Apparatus for selectively receiving variously polarized echo signals in a radio object-locating system, said apparatus including in combination, means for resolving each incoming signal into components along two reference axes so that the relationship of the resulting pair of components indicates the polarization of the respective signal, means for indicating the amplitude of the complete incoming signal, and comparing means for rendering said indicating means ineffective in response to a signal having components which have a relationship to each other differing from a predetermined relationship, said comparing means including an adjustable portion for changing the predetermined relationship so that signals having components which have any selected relationship are indicated.

References Cited

UNITED STATES PATENTS

| | | | |
|---|---|---|---|
| 2,130,389 | 9/1938 | Gothe | 250—33.65 |
| 2,153,209 | 4/1939 | Scharlau | 250—33.65 |
| 2,273,911 | 2/1942 | Usselman | 250—17.421 |
| 2,312,093 | 2/1943 | Hammond, Jr. | 343—100 |
| 2,421,028 | 5/1947 | King | 343—11 |
| 2,423,644 | 7/1947 | Evans | 343—14 |

RODNEY D. BENNETT, Primary Examiner

M. F. HUBLER, Assistant Examiner